United States Patent [19]

Cantwell

[11] Patent Number: 4,998,949

[45] Date of Patent: Mar. 12, 1991

[54] OVERSPEED LIMITER FOR GAS TURBINE AEROENGINE

[75] Inventor: Hugh F. Cantwell, Derby, England

[73] Assignee: Rolls-Royce Plc, London, England

[21] Appl. No.: 282,557

[22] Filed: Dec. 12, 1988

[30] Foreign Application Priority Data

Dec. 24, 1987 [GB] United Kingdom ............... 8730187

[51] Int. Cl.$^5$ .............................................. F02C 9/28
[52] U.S. Cl. ............................... 60/39.161; 60/39.281
[58] Field of Search ......................... 60/39.161, 39.281

[56] References Cited

U.S. PATENT DOCUMENTS

| 3,152,444 | 10/1964 | Peczkowski et al. | 60/39.281 |
|---|---|---|---|
| 3,332,233 | 7/1967 | McQueen | 60/39.281 |
| 4,218,879 | 8/1980 | Hagrman | 60/39.281 |
| 4,380,894 | 4/1983 | Abo et al. | 60/39.161 |
| 4,407,118 | 10/1983 | Burrage | 60/39.281 |
| 4,528,812 | 7/1985 | Cantwell | 60/39.281 |
| 4,578,945 | 4/1986 | Peck et al. | 60/39.281 |
| 4,845,943 | 7/1989 | LaPrad et al. | 60/39.281 |

Primary Examiner—Louis J. Casaregola
Attorney, Agent, or Firm—Cushman, Darby & Cushman

[57] ABSTRACT

A fuel control system for a three spool gas turbine aeroengine has a fuel contorl unit incorporating an intermediate pressure spool overspeed limiter. A fuel control signal is produced which drives a fuel metering unit to meter the flow of fuel to the engine in accordance with control and sensor inputs as acted upon by predetermined control laws incorporated in the fuel control unit. The engine has variable inlet guide vanes (VIGV's) in one or more of its compressor stages and a safety problem arises in that if the VIGV's fail at an angle for low engine speed while the engine is accelerating to a high speed, the rotational speed of the intermediate pressure spool can increase very quickly. This can lead to overshooting of maximum acceptable levels of spool speed before known overspeed limiters have time to regain control.

The problem is solved by incorporating an overspeed limiter function for the intermediate pressure spool whose speed limit setting is not just an upper limit as previously, but which varies between lower and upper limits as a function of at least one other internal working parameter of the engine such as the speed of the high pressure spool. The arrangement is such that whenever actual spool speed exceeds the variable limit, a signal is generated which is proportional to the difference between actual spool speed and the variable limit and which is used to reduce the fuel flow to the engine.

7 Claims, 4 Drawing Sheets ns, thereby endangering the integrity of the engine by over-stressing the rotating components. Such overspeeds caused or aggravated by a failure in positioning of the VIGV'S can happen very quickly. In three-spool engines such VIGV failures tend to cause the intermediate pressure spool to overspeed, whilst in two-spool engines the low pressure spool is caused to overspeed.

OVERSPEED LIMITER FOR GAS TURBINE AEROENGINE

Field of the Invention

The present invention relates to a fuel control system for a gas turbine aeroengine, and in particular to such a control system provided with a novel form of overspeed limiter.

In any fuel control system for gas turbine aeroengines, particularly those in commercial passenger-carrying transport aircraft, it is necessary to ensure that the probability of a control system component failure causing serious problems in control of the aircraft is extremely remote. This is particularly important in the case of an engine fitted with a digital electronic control system having full authority over the flow of fuel to the engine and perhaps also having full authority over other matters important to the safe functioning of the engine. In such digital systems component failure, though unlikely, is, if it happens, more likely to make the control of the engine from the aircraft flight station difficult or impossible than was the case with previous types of control systems. The most dangerous type of failure in control is one which results in a large over-supply of fuel to the engine, leading to a hazardous overspeed of the engine's compressor and turbine. A hazardous overspeed is an occasion when the rotational speed of the engine reaches a value at which the integrity of the rotating components is threatened. Consequently, it is usual to provide fuel control systems with hardware units or software modules (hereinafter referred to for the purposes of this specification as "overspeed limiters") intended to detect any hazardous overspeeds and automatically reduce the supply of fuel to an amount which keeps the engine at a safe speed.

Description of the Prior Art

Most modern gas turbine aeroengines in commercial transport aircraft are of the two spool or three spool type, each spool consisting of a compressor section and a corresponding turbine section, the latter being drivingly connected to the former by a shaft. In two spool engines, comprising low pressure and high pressure spools, and in three spool engines, comprising in addition an intermediate pressure spool, it is usual to provide the high pressure spool with an overspeed limiter. Under most circumstances such limitation of the high pressure spool speed is sufficient to limit the speed of the lower pressure spool or spools also, but abnormal operational conditions of the engine can arise which make it necessary to provide a further overspeed limiter for the low pressure spool, in the case of a two spool engine, and for the intermediate pressure spool, in the case of a three spool engine.

One important contributory factor to the occurrence of hazardous overspeeds in gas turbine aeroengines is found in engines whose low and/or intermediate pressure compressors incorporate variable inlet guide vanes, known as VIGV's. These VIGV's are controlled to assume an angle relative to the air entering the compressor which is appropriate for the compressor speeds and air flows being experienced, control being exercised either through a main engine control unit, which also, among other things, controls the fuel flow to the engine, or through a separate control unit which is completely independent of the unit having authority over the fuel flow. In either case, if a mechanical or an electronic failure causes the VIGV'S to remain at or assume an angle suited to low compressor speeds while the engine is being accelerated to high speed, the spool's normal operating speeds are very quickly exceeded, thereby endangering the integrity of the engine by over-stressing the rotating components. Such overspeeds caused or aggravated by a failure in positioning of the VIGV'S can happen very quickly. In three-spool engines such VIGV failures tend to cause the intermediate pressure spool to overspeed, whilst in two-spool engines the low pressure spool is caused to overspeed.

In general, prior art fuel control systems in commercial transport engines have incorporated an overspeed limiter which defined a maximum "acceptable" value or limit of spool speed with a margin of safety, detected occasions when the spool speed approached or exceeded this limit and automatically reduced fuel flow in the event of such detection. In cases where one of the spools of the engine is prone to experience very rapid accelerations due, e.g., to the VIGV problem described above, it has also been known to cause the relevant overspeed limiter to operate in phase advance mode in order to prevent severe overshooting of the speed limit by the spool speed. In such systems the overspeed limiter monitors the rate of increase of the spool speed as well as the spool speed itself and starts to reduce the fuel flow before the spool speed reaches the set limit, the onset of fuel reduction being determined as a function of the acceleration. However for some types of engine such techniques have been found inadequate to restrict spool speed overshoots to acceptable levels throughout the entire operational envelope of the engine, acceptable levels of overshoot being defined not only with reference to the need to avoid hazardous overspeeds, but also with respect to the need to minimise engine maintenance actions subsequent to such overshoots, since even small or transient excursions of spool speed above normal operating speeds have an effect upon the fatigue life of rotating components and can also cause excessive wear of seals in the engine.

Summary of the Invention

An object of the present invention is to provide an overspeed limiter which further ameliorates the problems associated with overspeeding of low pressure and intermediate pressure spools in gas turbine aeroengines.

According to the present invention, there is provided a fuel control system for a gas turbine aeroengine having at least one spool, the engine having a normal working characteristic defined by the normal working relationship between the rotational speed of the spool and at least one other internal working parameter of the engine, the fuel control system including:

controller means for receiving engine control commands from a flight station and sensor signals from sensors in the engine, the sensor signals representing working parameters of the engine, the controller means incorporating predetermined control laws for acting upon the control commands and sensor signals to produce a fuel control signal;

fuel metering means for receiving the fuel control signal and controlling fuel flow to the engine in accordance therewith; and overspeed limiter means comprising means for defining a variable speed limit for the spool as a function of said at least one other internal working parameter, which speed limit varies in correlation with said normal working characteristic up to a predetermined maximum acceptable limit of spool speed in a manner which avoids interference with normal operation of the engine, and means for overriding the effect of the fuel control signal on fuel flow such that fuel flow to the engine is trimmed whenever the spool speed exceeds the variable speed limit, thereby to avoid substantial overshooting of the predetermined maximum acceptable limit of spool speed.

This arrangement gives a speed limit for the spool which varies over the normal operational envelope of the aeroengine, so that even under extreme conditions, say, in which beginning with an engine idle speed condition the pilot has selected maximum engine power with the VIGV's failed at an angle which corresponds to a low engine speed, the speed limit of the spool is either not exceeded at all, or if exceeded, is only exceeded by a relatively small amount, this advantage being achieved because the overspeed limiter defines a speed limit for the spool which is low when the spool speed is low, thereby enabling the fuel control system to start to reduce the fuel flow to the engine at an early stage in the speeding up of the spool.

Note that for the purposes of the present invention, the term "internal working parameter of the engine" means a variable condition within the engine itself, such as spool speed, turbine temperature, compressor exit pressure, etc., as opposed to a variable condition outside the engine, such as total temperature of the air at entry to the engine. The invention requires the parameter by which the speed limit is primarily varied to be an internal variable of the engine, rather than a variable external to it, because only internal variables will be responsive to an overspeed. However, provided that at least one such internal variable is utilised to vary the speed limit, an external variable, such as total temperature at entry to the engine, can be utilised to give a second-order variation in the speed limit.

In one embodiment of the invention, the above-mentioned means for overriding the effect of the fuel control signal on fuel flow comprises:

comparison means for comparing the sensed value of spool speed with the value of the variable speed limit for said spool and outputting a fuel trim signal which is a function of the difference between the sensed value and the value of the variable speed limit, said fuel trim signal being output only if the sensed value is greater than the value of the variable speed limit, and fuel control signal trimming means for receiving said fuel control signal and said fuel trim signal, subtracting the latter from the former, and outputting the resulting difference signal as a modified fuel control signal for controlling fuel flow to the engine.

In an alternative embodiment of the invention said means for overriding the effect of the fuel control signal on fuel flow comprises comparison means as mentioned above and further fuel metering means for receiving said fuel trim signal and trimming fuel flow to the engine in accordance therewith.

For the first embodiment of the invention the overspeed limiter preferably comprises at least one program and data module in a main digital electronic fuel control unit which produces the fuel control signal. However, in cases where the fuel control system is part of a main digital electronic control unit having authority over other variable features in the engine besides the fuel metering means, in particular the VIGV's, it is preferred that the overspeed limiter comprises a device which is completely independent of the main digital electronic control unit.

Preferably, the fuel control system is for a gas turbine aeroengine having at least a high pressure spool and a relatively lower pressure spool, said normal working characteristic being defined by the normal working relationship between the rotational speed of said lower pressure spool and said at least one other internal working parameter of the engine, said variable speed limit being defined for said lower pressure spool.

Conveniently, the variable speed limit is a function of at least the high pressure spool speed. Specifically, the speed limit may be proportional to the high pressure spool speed; however we believe there may be advantages in making the speed limit a function also of the total temperature of the air at entry to the engine.

An embodiment of the invention will now be described, by way of example only, with reference to the accompanying drawings in which:

Detailed Description of the Invention

Figure 1:
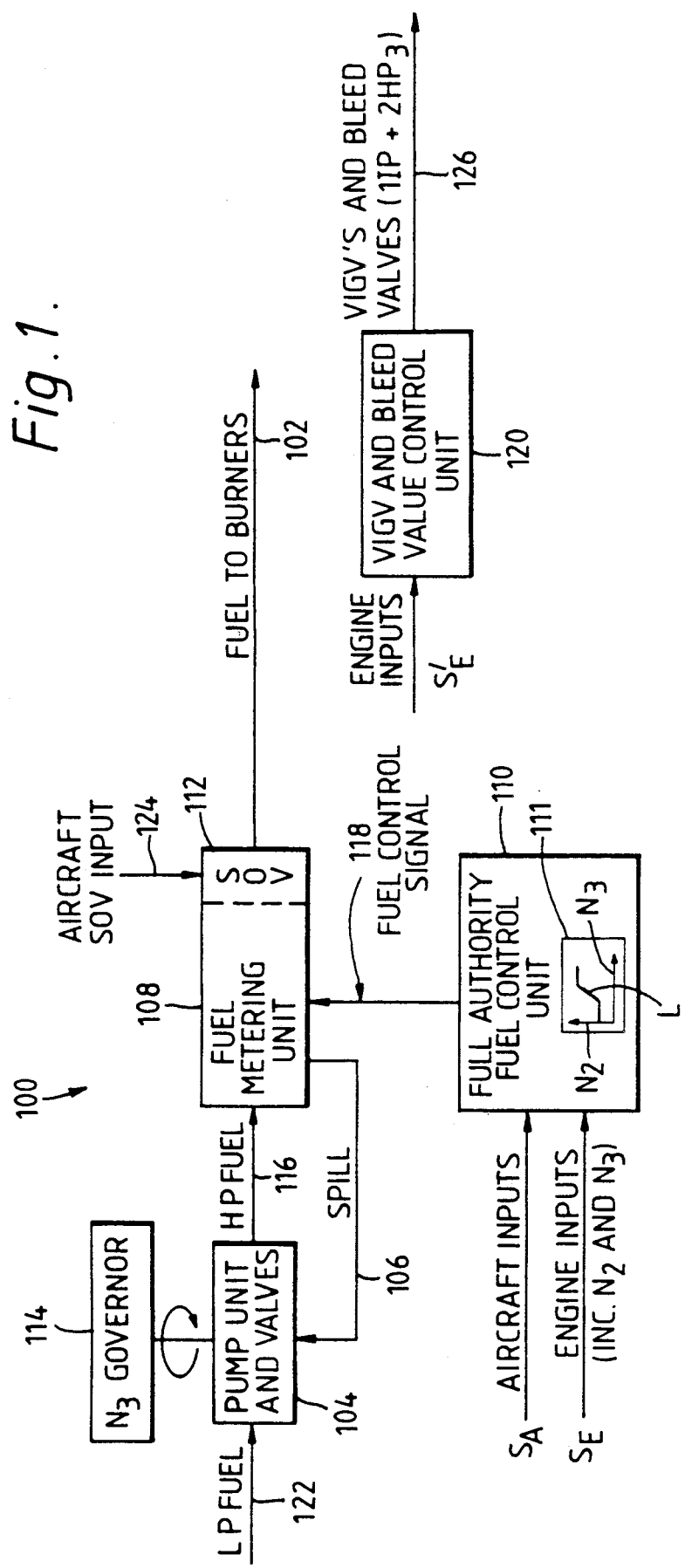
FIG. 1 is a block diagram illustrating in simplified form a fuel control system for a triple spool gas turbine aeroengine, which control system incorporates an overspeed limiter in accordance with the present invention.

Referring firs to FIG. 1, a control system 100 controls the fuel flow 102 to a three spool gas turbine aeroengine (not shown), comprising low, intermediate and high pressure spools, as known. In brief, the control system 100 comprises various units including a mechanical fuel pump 104, a pump spill return circuit 106, an electromechanical fuel flow metering unit 108, a main engine digitaL electronic control unit 110 incorporating an overspeed limiter software module 111, and a shut-off valve 112, which is integrated with the fuel metering unit 108.

Although having full authority over the fuel flow 102 to the aeroengine by means of fuel control signal 118 to the fuel metering unit 108, the fuel control unit 110 does not have any authority over other engine functions, and as can be seen from FIG. 1, the VIGV's and the bleed valves in the intermediate and high pressure compressors of the engine are controlled by a different control unit 120 which is completely separate from the fuel control unit 110 and the rest of the control system 100.

In operation, the fuel 122 at low pressure is pumped up to a high pressure in the fuel line 116 by the fuel pump 104, the output of which is throttled by the fuel metering unit 108. The latter item controls the output of the pump 104 in accordance with the fuel control signal 118 produced by the fuel control unit 110. The fuel control unit 110 receives a number of signals $S_A$ and $S_E$ comprising respectively inputs from the aircraft flight station and inputs from various speed, temperature and pressure sensors in the engine. In the present case, signals $S_E$ include the intermediate spool speed $N_2$ and the high pressure spool speed $N_3$. As known in the industry, the fuel flow control unit 110 applies certain predetermined control laws to the signals $S_A$ and $S_E$ for normal control of the engine and thereby produces the fuel control signal 118. However, in addition the overspeed limiter software module 111 comprises a novel speed limiting control law which defines a variable limit L of $N_2$ as a function of $N_3$, compares the sensed value of $N_2$ with its allowable limit L relative to the sensed value of $N_3$, and, if the sensed value of $N_2$ exceeds that limit, overrides the other control laws and alters the fuel control signal 118 to obtain an appropriate reduction of the fuel flow for reducing $N_2$ back below the limit L. Hence, upon detection of an overspeed of the intermediate pressure spool of the engine, software 111 reduces the fuel flow 102 by means of the metering unit 108, thereby increasing the back pressure in the fuel line 116 and opening or further opening a bypass valve (not shown) controlling fuel flow through the spill return loop 106. This bypass valve may be within metering unit 108 or pump unit 104. The excess fuel passed by the bypass valve then passes back to the inlet of the pump 104 for recirculation.

Finally, the metered fuel 102 is passed to the burners in the combustion chambers of the engine through the shut-off valve unit 112, whose purpose is completely to prevent fuel flow to the engine when the engine is shut down or before it is started, this being achieved by electrical actuation signals 124 from the flight station of the aircraft. The VIGV and bleed valve control unit 120 also receives input signals $S'_E$ from sensors in the engine and likewise applies appropriate control laws to produce actuation signals 126 for controlling the movement of the VIGV's and the compressor bleed valves in accordance with engine conditions.

Regarding the fuel pump 104, this is driven through a gear train (not shown) from one of the shafts of the aeroengine and its output is directly proportional to the speed at which it is driven. However, the pump unit 104 incorporates a valve (not shown) which is under the control of a mechanical governor 114 driven at a variable speed proportional to $N_3$ from the high pressure spool of the aeroengine. At the speeds experienced by the high pressure spool during normal operation of the engine, the governor 114 does not operate the valve, which remains open and therefore allows the pump unit 104 to deliver its full output to the fuel metering unit 108 along fuel line 116. However, in the event of the high pressure spool speed $N_3$ exceeding a certain value indicative of a hazardous overspeed of the spool, the governor 114 acts to close the valve and reduces the delivery of fuel to the engine by an amount sufficient to bring the high pressure spool speed within allowable limits. This governor 114 does not form part of the present invention, but the present invention is complementary to it in that merely preventing overspeeds of the high pressure spool is not always sufficient in itself to prevent overspeeds of the intermediate pressure spool (or the low pressure spool in case of a two spool engine).

Although not indicated in the diagram, the control system 100, including the control unit 120, is located on or adjacent the outer casings of the aeroengine.

Figure 2:
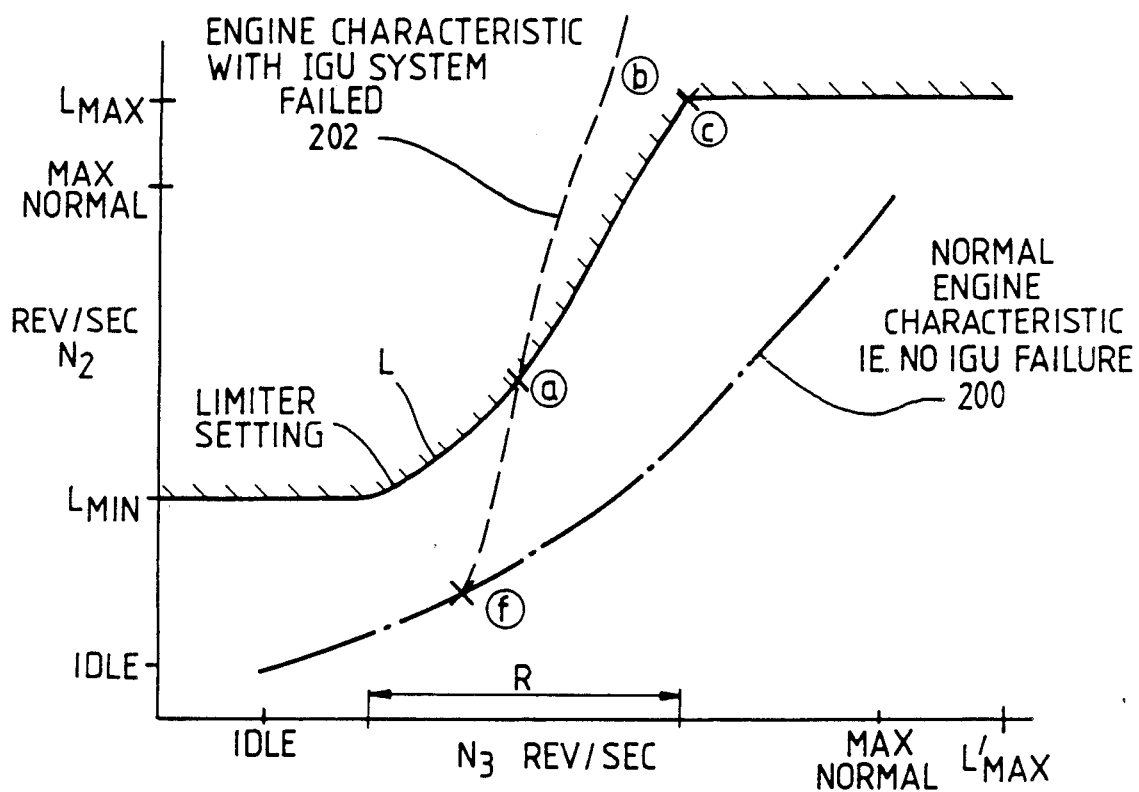
FIG. 2 is a graphical representation of the way in which the overspeed limiter incorporated in the system of FIG. 1 sets a speed limit which varies over the normal operational range over the aeroengine as a function of an internal working parameter of the engine.

Turning now to FIG. 2, the speed $N_2$ of the intermediate pressure spool of a three spool engine is plotted against the speed $N_3$ of the high pressure spool. During normal operation of the engine, the relationship between $N_2$ and $N_3$ is described by the chain dashed line 200 extending between the coordinates defined by the respective "IDLE" and "MAX NORMAL" speeds on the horizontal and vertical axes. This may be referred to as the "normal characteristic" of the engine, for which the VIGV's are in their correct positions.

If, during an acceleration of the engine from idling speed to normal maximum revolutions per second, there occurs, for example, at a point (f), a failure in the VIGV and bleed valve control unit 120 (FIG. 1) which causes the VIGV's to remain at or assume a position suited to IDLE speed, the speed $N_2$ of the intermediate pressure spool increases much faster than the speed $N_3$ of the high pressure spool if no speed limiting control is exercised on $N_2$ and the relationship between $N_2$ and $N_3$ becomes as shown by the dashed line 202 (f)–(b), leading very rapidly (say, in the course of just a few tens of revolutions of the spool) to overspeeding of the spool as $N_2$ exceeds a predetermined maximum acceptable limit of spool speed $L_{MAX}$ at point (b). The dashed line 202 may be referred to as the "VIGV-failed characteristic" of the engine.

The overspeed limiter software module 111 (FIG. 1) prevents hazardous $N_2$ overspeeds and copes with reaction time problems by implementing an algorithm which does not only set a discrete upper speed limit $L_{MAX}$ for $N_2$ as in the previously mentioned systems, but also sets a speed limit L for $N_2$ which varies with the sensed value of $N_3$ between a lower $N_2$ speed limit $L_{MIN}$ and the upper safe $N_2$ speed limit $L_{MAX}$ over a range R of values of $N_3$. As can be seen from FIG. 2, the control law embodied in the algorithm schedules the variable speed limit L always to be above the normal characteristic 200 of the engine so that during normal operation of the engine the overspeed limiter 111 does not have any effect upon the fuel control signal 118. In fact, $L = CN_3$, where C is a simple constant. Alternatively, C may become a further variable by including in it a further internal working parameter of the engine, or other variable, as described later.

Figure 3:
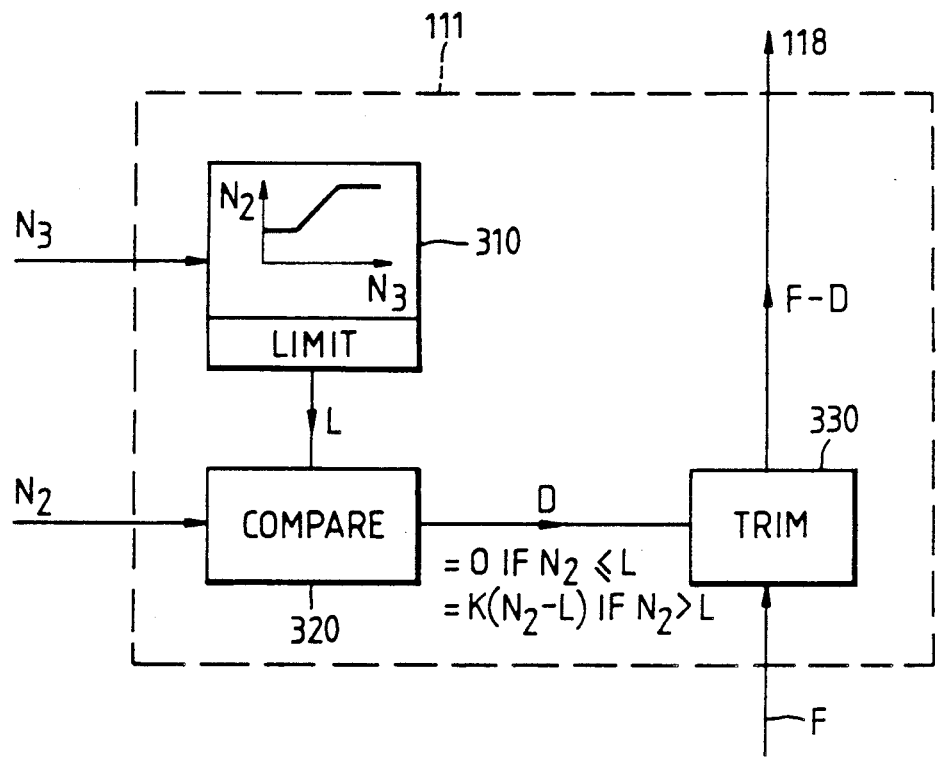
FIG. 3 is a block diagram illustrating the working of the overspeed limiter in more detail.

FIG. 3 shows implementation of the software module 111 in more detail as a series of three interlinked software functions 310, 320 and 330. LIMIT function 310 represents the algorithm defining the variable $N_2$ limit L, as derived from the sensed value $N_3$ of actual HP spool speed as discussed in relation to FIG. 2. LIMIT function 310 samples the sensed value of $N_3$ and holds it in a temporary store while it scans a schedule of values of $N_3$ held in ROM, comparing each ROM value of $N_3$ in turn with the sensed value of $N_3$ until a match is obtained, whereupon a corresponding value of L is read from a schedule of values of $N_2$ also in ROM and is output to COMPARE function 320. This function samples the sensed value of $N_2$ and holds it in a temporary store for comparison with the value L of $N_2$ input from LIMIT function 310. Normally the output of function 320 is gated, but if the sensed value of $N_2$ is greater than the value L, it is arranged that the gate is enabled and COMPARE function 320 outputs a value D which is proportional to the value $N_2 - L$. This is used by TRIM function 330 to modify the normal fuel demand signal F derived from the normal engine control laws embodied in the rest of the fuel control unit 110 (FIG. 1). Hence, TRIM function 330 merely performs the subtract operation $F - D$ and outputs the result as the fuel control signal 118, thereby causing appropriate reduction of the fuel flow. Since $D = K(N_2 - L)$, where K is a constant, it will be seen that the value of K should be chosen to give suitably rapid reduction in the fuel flow for minimising the amplitudes of $N_2$ overshoots.

Returning now to consideration of FIGS. 1 and 2, there will be described the "worst case" sequence of events consequent upon a component failure in the control unit 120, or elsewhere, having the effect of causing the VIGV's to assume their low speed position when maximum power has been selected by the pilot starting from IDLE speed. First of all, the engine will accelerate from IDLE along line (f) –(a) until at (a) the limiter setting L is reached and the fuel control signal 118 is trimmed by the overspeed limiter 111 to quickly and substantially reduce fuel flow to the engine. After minor overshooting of the limiter line L towards (b), the engine speeds $N_2$ and $N_3$ follow line (a)-(c) as $N_3$ increases and eventually $N_2$ settles on maximum $N_2$ limiter setting $L_{MAX}$ at (c), assuming the thrust lever is still at the maximum power setting. As indicated, $N_3$ is itself limited to a maximum acceptable value $L'_{MAX}$ by a separate overspeed limiter or governor as known.

It will be seen from the above that overshoot of $L_{MAX}$ is minimised because the overspeed limiter 111 defines a speed limit L for $N_2$ which is low when the actual sensed value of $N_2$ is low, thereby enabling the fuel control system to start to reduce the fuel flow to the engine at an early stage in the speeding up of the intermediate pressure spool. FIG. 2 is drawn to an arbitrary scale and it should be understood that $L_{MIN}$ and the curve L could be closer to the normal engine characteristic 200 than shown to minimise distance (f)–(a) for an even faster-acting overspeed control, subject of course to the proviso that limit $L_{MIN}$ and variable limit L should not interfere with normal operation of the engine.

Figure 4:
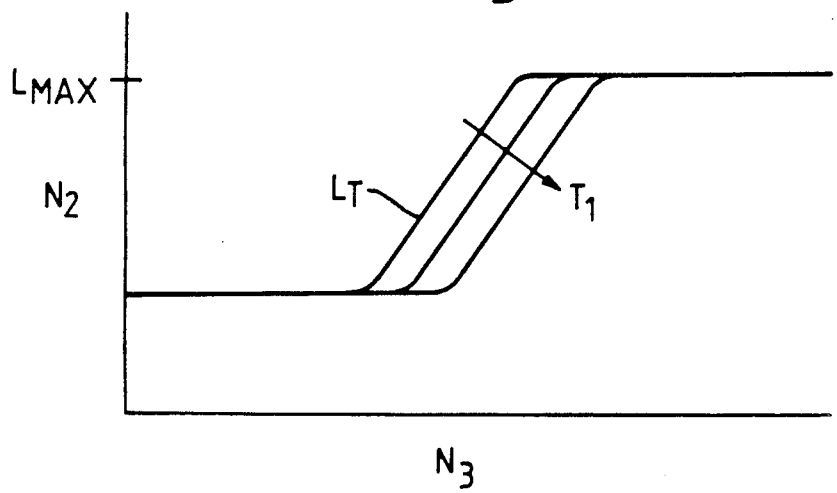
FIG. 4 is a graph similar to FIG. 2, but showing how the speed limit set by the overspeed limiter can be made to vary in dependence upon an additional working parameter of the aeroengine.

The overspeed control law considered so far defines the variable speed limit L between lower and upper limits $L_{MIN}$ and $L_{MAX}$ as a function only of the high pressure spool speed $N_3$. However, there may be advantages in particular circumstances in causing L to vary as a function of another of the internal working parameters of the engine instead of $N_3$, such as the speed of the low pressure spool ($N_1$) or the pressure ratio of the engine. Furthermore, it may be advantageous to define the variable speed limit as a function of two (or even more) variables, at least one, of course, being an internal working parameter of the engine. FIG. 4 shows such a situation, in which the variable speed limit $L_T$ is defined as a function of $N_3$ and the total temperature $T_1$ of the air at entry to the engine, $T_1$ being a variable which is external to the engine. This is particularly useful because the exact relationship between $N_2$ and $N_3$ varies with $T_1$, thereby causing the above-mentioned "normal characteristic" of the engine to alter its position on the graph of $N_2$ versus $N_3$. As can be seen from FIG. 4, if the overspeed limiter is programmed to calculate limiting values of $N_2$ from inputs comprising sensor signals representing both $N_3$ and $T_1$, the variable speed limit $L_T$ so defined can be caused to vary its position on the graph with $T_1$ so as to correlate more consistently with the position of the normal characteristic. In this way the operation of the overspeed limiter is rendered consistent despite variations in $T_1$.

The limit curves and characteristics shown in FIGS. 2 and 4 can readily be established for specific types and standards of engine by the usual tests as known to technicians and engineers in the industry, involving determining the $N_2$ to $N_3$ relationship at different VIGV angles and different atmospheric conditions etc.

Figure 5:
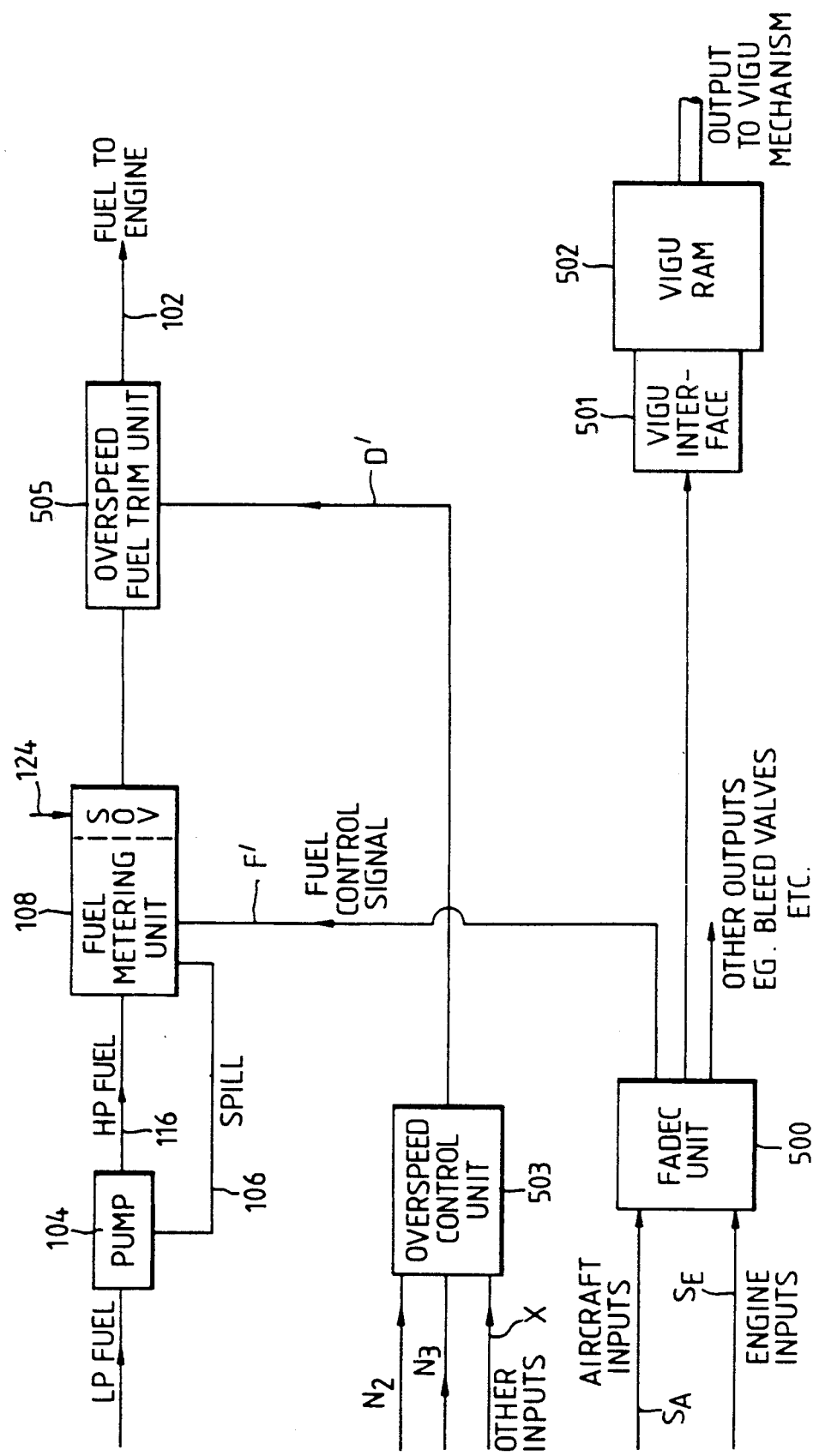
FIG. 5 is a block diagram illustrating in simplified form an alternative embodiment of the invention.

Turning now to FIG. 5, in which parts similar to those shown in FIG. 1 are given the same reference numbers, there is shown an embodiment of the invention adapted to the case in which the fuel control system is integrated into a so-called "full authority digital electronic control" or FADEC system, in which main FADEC unit 500 directly controls not only the fuel metering unit 108, as did the unit 110 in FIG. 1, but also the VIGV's, compressor bleed valves and other variable features on the engine, which were controlled by a separate control unit 120 in FIG. 1. The FADEC unit 500 controls the VIGV's via an electronic interface 501 and an hydraulic ram 502 connected to a vane positioning mechanism.

In such a case, failures which drive the VIGV system to the low engine speed position could possibly be failures in the FADEC unit 500 itself. Consequently, it is not satisfactory to incorporate the speed limiter in the FADEC unit 500, because detection of an overspeed and the remedy for it could then rely on a faulty FADEC unit. Such a failure mode must therefore be catered for by a device which is completely independent of the FADEC unit 500, namely, a physically distinct overspeed control unit 503.

In such a FADEC type of control system the task of preventing overshoots of a fixed maximum speed limit for the chosen spool, which again, for example, is the intermediate pressure spool having rotational speed $N_2$, can be even more arduous then for an arrangement like FIG. 1, particularly if a failure in the FADEC unit also drives the fuel flow given by the main metering unit 108 to a high value. Consequently, a variable speed limit is a particularly desirable feature.

To achieve this in FIG. 5, the overspeed control unit 503, which could be implemented as an analogue device but again is preferably of a digital electronic type, receives sensor inputs of spool speeds $N_2$ and $N_3$, plus any other inputs X required, uses $N_3$ plus any other desired engine working parameters to derive a variable speed limit, such as L or $L_T$, as described in connection with FIGS. 2 to 4, compares the speed limit with the actual sensed value of $N_2$ and produces an output difference signal D' proportional to the difference between the sensed value of $N_2$ and the speed limit, provided that $N_2$ is greater than the limit, as described in connection with FIG. 3. However, instead of being used to trim the fuel demand signal F', signal D', is used as a drive signal to control an extra fuel metering device in the form of the overspeed fuel trim unit 505 downstream of the fuel metering unit 108. Alternatively, the overspeed fuel trim unit 505 could be positioned upstream of the fuel metering unit 108. Upon receipt of signal D', unit 505 trims the flow of fuel 102 to the engine, thus reducing it by the appropriate amount. This of course causes an increase in back pressure in the preceding parts of the system and consequently the amount of fuel flowing back through the spill loop 106 is increased as the by-pass valve associated with spill loop 106 opens for excess fuel as described previously in connection with FIG. 1.

Although the above description with respect to the drawings is focused on the invention as proposed for use with three spool engines, the principles expounded are applicable to two spool engines, or even to single spool engines, though in the latter case it will be evident that the variable speed limit for the single spool must be derived from an engine working parameter such as the engine pressure ratio as already mentioned, plus any other parameters such as $T_1$ it is desired to incorporate in the overspeed control law.

I claim:

1. A fuel control system for a gas turbine aeroengine having at least one spool, the engine having a normal working characteristic defined by the normal working relationship between the rotational speed of the spool and at least one other internal working parameter of the engine, the fuel control system including:

controller means for receiving engine control commands form a flight station and sensor signals from sensors in the engine, the sensor signals representing working parameters of the engine, the controller means incorporating predetermined control laws for acting upon the control commands and sensor signals to produce a fuel control signal;

fuel metering means for receiving the fuel control signal and controlling fuel flow to the engine in accordance therewith; and overspeed limiter means comprising means for defining a variable speed limit for the spool as a function of said at least one other internal working parameter, which speed limit varies in correlation with said normal working characteristic up to a predetermined maximum acceptable limit of spool speed in a manner which avoids interference with normal operation of the engine, and means for overriding the effect of the fuel control signal on fuel flow such that fuel flow to the engine is trimmed whenever the spool speed exceeds the variable speed limit, thereby to avoid substantial overshooting of the predetermined maximum acceptable limit of spool speed; said gas turbine aeroengine having at least a high pressure spool and a relatively lower pressure spool, said normal working characteristic being defined by the normal working relationship between the rotational speed of said lower pressure spool and said at least one other internal working parameter of the engine, said variable speed limit being defined for said lower pressure spool.

2. A fuel control system according to claim 1 in which said means for overriding the effect of the fuel control signal on fuel flow comprises:

comparison means for comparing the sensed value of spool speed with the value of the variable speed limit for said spool and outputting a fuel trim signal which is a function of the difference between the sensed value and the value of the variable speed limit, said fuel trim signal being output only if the sensed value is greater than the value of the variable speed limit, and fuel control signal trimming means for receiving said fuel control signal and said fuel trim signal, subtracting the latter from the former, and outputting the resulting difference signal as a modified fuel control signal for controlling fuel flow to the engine.

3. A fuel control system according to claim 1 in which said means for overriding the effect of the fuel control signal on fuel flow comprises:

comparison means for comparing the sensed value of spool speed with the value of the variable speed limit for said spool and outputting a fuel trim signal which is a function of the difference between the sensed value and the value of the variable speed limit, said fuel trim signal being output only if the sensed value is greater than the value of the variable speed limit, and further fuel metering means for receiving said fuel trim signal and trimming fuel flow to the engine in accordance therewith.

4. A fuel control system according to claim 1 in which the overspeed limiter comprises at least one program and data module in a main digital electronic fuel control unit which produces the fuel control signal.

5. A fuel control system according to claim 1 wherein said variable speed limit is a function of at least the high pressure spool speed.

6. A fuel control system according to claim 5 wherein said variable speed limit is proportional to the high pressure spool speed.

7. A fuel control system according to claim 5 wherein said variable speed limit is also a function of the total temperature of the air at entry to the engine.

* * * * *